United States Patent
Hong

(10) Patent No.: US 11,206,522 B2
(45) Date of Patent: Dec. 21, 2021

(54) METHOD AND DEVICE FOR EQUIPMENT MANAGEMENT

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 102 days.

(21) Appl. No.: 16/599,115

(22) Filed: Oct. 10, 2019

(65) Prior Publication Data

US 2020/0045524 A1  Feb. 6, 2020

Related U.S. Application Data

(63) Continuation of application No. PCT/CN2017/081286, filed on Apr. 20, 2017.

(51) Int. Cl.
| | | |
|---|---|---|
| H04W 4/80 | (2018.01) |
| H04W 4/70 | (2018.01) |
| H04W 76/11 | (2018.01) |
| H04W 64/00 | (2009.01) |
| H04W 8/22 | (2009.01) |
| H04L 29/08 | (2006.01) |

(52) U.S. Cl.
CPC .............. *H04W 4/80* (2018.02); *H04L 67/125* (2013.01); *H04W 4/70* (2018.02); *H04W 8/22* (2013.01); *H04W 64/00* (2013.01); *H04W 76/11* (2018.02)

(58) Field of Classification Search
CPC ........... H04W 4/70; H04W 4/80; H04W 8/22; H04W 8/245; H04W 76/11; H04L 67/125
See application file for complete search history.

(56) References Cited

U.S. PATENT DOCUMENTS

| | | | |
|---|---|---|---|
| 9,462,041 B1* | 10/2016 | Hagins ................ H04L 12/2803 |
| 2005/0096753 A1* | 5/2005 | Arling ................... H04L 12/282 |
| | | | 700/11 |
| 2010/0191352 A1* | 7/2010 | Quail .................. H04L 12/2809 |
| | | | 700/90 |

(Continued)

FOREIGN PATENT DOCUMENTS

| | | |
|---|---|---|
| CN | 101969453 A | 2/2011 |
| CN | 104581947 A | 4/2015 |

(Continued)

OTHER PUBLICATIONS

International Search Report in international application No. PCT/CN2017/081286, dated Jan. 10, 2018.

(Continued)

*Primary Examiner* — Gary Mui
(74) *Attorney, Agent, or Firm* — Syncoda LLC; Feng Ma

(57) ABSTRACT

A method for equipment management includes: receiving a management control instruction of a target terminal with respect to the NB-IoT equipment and forwarded by a base station, the target terminal being a terminal used for managing the NB-IoT equipment; and executing an operation corresponding to the management control instruction. The method and device for equipment management allow convenient and highly efficient control of the NB-IoT equipment via the terminal to execute the corresponding operation.

13 Claims, 17 Drawing Sheets

(56) References Cited

U.S. PATENT DOCUMENTS

| | | | | |
|---|---|---|---|---|
| 2011/0026436 A1* | 2/2011 | Karaoguz | ......... | H04M 1/72522 370/254 |
| 2011/0211584 A1* | 9/2011 | Mahmoud | ........... | H04L 12/2838 370/401 |
| 2012/0011233 A1* | 1/2012 | Dixon | ................ | H04L 65/1073 709/221 |
| 2014/0244001 A1* | 8/2014 | Glickfield | ............... | H04L 67/16 700/33 |
| 2014/0330959 A1* | 11/2014 | Zhang | ................ | H04L 12/2803 709/224 |
| 2014/0376919 A1* | 12/2014 | Nykoluk | ................ | G08C 23/04 398/107 |
| 2015/0006695 A1* | 1/2015 | Gupta | ..................... | H04W 4/70 709/223 |
| 2015/0019710 A1* | 1/2015 | Shaashua | ................ | G06F 16/35 709/224 |
| 2016/0112260 A1* | 4/2016 | Pai | ......................... | H04L 63/10 709/222 |
| 2016/0135241 A1* | 5/2016 | Gujral | .................... | H04L 67/12 370/328 |
| 2016/0195881 A1* | 7/2016 | Britt | ....................... | G08C 17/02 700/276 |
| 2017/0019390 A1* | 1/2017 | Gu | .......................... | H04L 63/08 |
| 2017/0099682 A1 | 4/2017 | Priyanto et al. | | |
| 2017/0201385 A1* | 7/2017 | Kravitz | ................ | H04L 9/0825 |
| 2019/0058769 A1* | 2/2019 | Keranen | ................. | H04L 67/16 |
| 2019/0087794 A1* | 3/2019 | Cho | .......................... | G06F 8/65 |
| 2019/0260707 A1* | 8/2019 | Kesavan | .............. | H04L 67/025 |

FOREIGN PATENT DOCUMENTS

| | | |
|---|---|---|
| CN | 105185085 A | 12/2015 |
| CN | 106131076 A | 11/2016 |
| CN | 205787872 U | 12/2016 |
| CN | 106408836 A | 2/2017 |
| CN | 106413061 A | 2/2017 |

OTHER PUBLICATIONS

1st Office Action in CN 201780000257.9 dated Apr. 26, 2020.
Extended European Search Report in EP17906430.8 dated Mar. 4, 2020.
John Weber et al., "Fundamentals of IoT device management"—IoT DesignXP055671251, Apr. 23, 2016.

* cited by examiner

METHOD AND DEVICE FOR EQUIPMENT MANAGEMENT

CROSS-REFERENCE TO RELATED APPLICATION

This application is a continuation of, and claims priority, to PCT patent application No. PCT/CN2017/081286 filed on Apr. 20, 2017, the disclosure of which is hereby incorporated by reference in its entirety.

BACKGROUND 5G, i.e., New Radio (NR) network related standardization is being carried out in the 3rd Generation Partnership Project (3GPP). In the 5G system, Narrow Band Internet of Things (NB-IOT) technology is defined. NB-IoT is built on a cellular network and consumes only about 180 kHz of bandwidth. It may be directly deployed in a Global System for Mobile Communication (GSM) network, a Universal Mobile Telecommunications System (UMTS) network, or a Long-Term Evolution (LTE) network, to reduce deployment cost and achieve smooth upgrades.

Accordingly, a large number of devices using NB-IOT technologies, namely NB-IOT devices, such as smart meters, smart printers, smart health medical devices, etc., have emerged.

SUMMARY

The present disclosure relates generally to the field of communications, and more specifically to a device management method and apparatus.

Various embodiments of the present disclosure provide a device management method and apparatus.

According to a first aspect of the embodiments of the present disclosure, there is provided a device management method, applied to a Narrow Band Internet of Things (NB-IOT) device, the method including:

receiving a management control instruction of a target terminal for the NB-IOT device forwarded by a base station, the target terminal being a terminal for managing the NB-IOT device; and performing an operation corresponding to the management control instruction.

In some embodiments, before receiving the management control instruction of the target terminal for the NB-IOT device forwarded by the base station, the method further includes:

after a booting operation is completed, reporting target device information of the NB-IOT device to the base station, so that the base station sends paging information that carries the target device information to the target terminal after determining the target terminal according to the target device information, and the target terminal adds the NB-IOT device in a device management list based on the paging information, the device management list being a device list of all devices managed by the terminal.

In some embodiments, the target device information includes at least one of following:

a device identifier of the NB-IOT device, identifier information related to the target terminal, information of geographical position where the NB-IOT device is currently located, working frequency band information of the NB-IOT device, and a device type of the NB-IOT device.

According to a second aspect of the embodiments of the present disclosure, there is provided a device management method, applied to a base station, the method including:

receiving a management control instruction of a target terminal for a NB-IOT device, wherein the target terminal is a terminal for managing the NB-IOT device, and the management control instruction carries a device identifier of the NB-IOT device; and forwarding the management control instruction to the NB-IOT device according to the device identifier, so that the NB-IOT device performs an operation corresponding to the management control instruction.

In some embodiments, before receiving the management control instruction of the target terminal for the NB-IOT device, the method further includes:

receiving target device information of the NB-IOT device reported by the NB-IOT device after completing a booting operation;

determining the target terminal according to the target device information; and sending paging information carrying the target device information to the target terminal, so that the target terminal adds the NB-IOT device in a device management list based on the paging information, the device management list being a device list of all devices managed by the terminal.

In some embodiments, the target device information includes at least one of followings:

a device identifier of the NB-IOT device, identifier information related to the target terminal, information of geographical position where the NB-IOT device is currently located, working frequency band information of the NB-IOT device, and a device type of the NB-IOT device.

In some embodiments, the determining the target terminal according to the target device information includes:

when the target device information includes the identifier information related to the target terminal, using a terminal indicated by the identifier information as the target terminal; and when the target device information does not include the identifier information related to the target terminal, searching for a target terminal identifier corresponding to the target device information according to a pre-stored corresponding relationship between the device information and the terminal identifier, and using a terminal corresponding to the target terminal identifier as the target terminal.

According to a third aspect of the embodiments of the present disclosure, there is provided a device management method, applied in a terminal, the method including:

determining, in a device management list, a NB-IOT device needing a management control currently, the device management list being a device list of all devices managed by the terminal;

generating a management control instruction for managing the NB-IOT device, the management control instruction carrying a device identifier of the NB-IOT device; and sending the management control instruction to a base station, so that the base station forwards the management control instruction to the NB-IOT device according to the device identifier, and the NB-IOT device performs an operation corresponding to the management control instruction.

In some embodiments, the generating the management control instruction for controlling the NB-IOT device includes:

outputting a preset control instruction option corresponding to the NB-IOT device; and according to a target control instruction option selected by a user from the preset control instruction option, generating a management control instruction comprising a control content of the target control instruction option.

In some embodiments, before determining the NB-IOT device needing to be controlled currently in the device management list, the method further includes:

receiving paging information that is sent by the base station and carries target device information of the NB-IOT device; and adding the NB-IOT device to the device management list based on the paging information.

In some embodiments, the target device information includes at least one of followings:

a device identifier of the NB-IOT device, identifier information related to the target terminal, information of geographical position where the NB-IOT device is currently located, working frequency band information of the NB-IOT device, and a device type of the NB-IOT device.

According to a fourth aspect of the embodiments of the present disclosure, there is provided a device management apparatus, applied to a Narrow Band Internet of Things (NB-IOT) device, the apparatus including:

a first receiving module configured to receive a management control instruction of the target terminal for the NB-IOT device forwarded by a base station, the target terminal being a terminal for managing the NB-IOT device; and an execution module configured to perform an operation corresponding to the management control instruction.

In some embodiments, the apparatus further includes:

a reporting module configured to, after a booting operation is completed, report target device information of the NB-IOT device to the base station, so that the base station sends paging information that carries the target device information to the target terminal after determining the target terminal according to the target device information, and the target terminal adds the NB-IOT device in a device management list based on the paging information, the device management list being a device list of all devices managed by the terminal.

In some embodiments, the target device information includes at least one of following:

a device identifier of the NB-IOT device, identifier information related to the target terminal, information of geographical position where the NB-IOT device is currently located, working frequency band information of the NB-IOT device, and a device type of the NB-IOT device.

According to a fifth aspect of the embodiments of the present disclosure, there is provided a device management apparatus, applied in a base station, the apparatus including:

a second receiving module configured to receive a management control instruction of the target terminal for an NB-IOT device, the target terminal being a terminal for managing the NB-IOT device, and the management control instruction carrying a device identifier of the NB-IOT device; and a forwarding module configured to forward the management control instruction to the NB-IOT device according to the device identifier, so that the NB-IOT device performs an operation corresponding to the management control instruction.

In some embodiments, the apparatus further includes:

a third receiving module configured to receive target device information that is reported by the NB-IOT device after a booting operation is completed;

a terminal determining module configured to determine the target terminal according to the target device information; and a first sending module configured to send paging information that carries the target device information to the target terminal, so that the target terminal adds the NB-IOT device to a device management list based on the paging information, the device management list being a device list of all devices managed by the terminal.

In some embodiments, the target device information includes at least one of followings:

a device identifier of the NB-IOT device, identifier information related to the target terminal, information of geographical position where the NB-IOT device is currently located, working frequency band information of the NB-IOT device, and a device type of the NB-IOT device.

In some embodiments, the terminal determining module includes:

a first determining sub-module configured to, when the target device information includes the identifier information related to the target terminal, use a terminal indicated by the identifier information as the target terminal; and a second determining sub-module configured to, when the target device information does not include the identifier information related to the target terminal, search for a target terminal identifier corresponding to the target device information according to a pre-stored corresponding relationship between the device information and the terminal identifier, and use a terminal corresponding to the target terminal identifier as the target terminal.

According to a sixth aspect of the embodiments of the present disclosure, there is provided a device management apparatus, applied in a terminal, the apparatus including:

a device determining module configured to determine, in a device management list, an NB-IOT device needing a management control currently, the device management list being a device list of all devices managed by the terminal;

an instruction generating module configured to generate a management control instruction for managing the NB-IOT device, the management control instruction carrying a device identifier of the NB-IOT device; and a second sending module configured to send the management control instruction to a base station, so that the base station forwards the management control instruction to the NB-IOT device according to the device identifier, and the NB-IOT device performs an operation corresponding to the management control instruction.

In some embodiments, the instruction generating module includes:

an output sub-module configured to output a preset control instruction option corresponding to the NB-IOT device; and an instruction generating sub-module configured to, according to a target control instruction option selected by a user from the preset control instruction option, generate a management control instruction comprising a control content of the target control instruction option.

In some embodiments, the apparatus further includes:

a fourth receiving module configured to receive paging information that is sent by the base station and carries target device information of the NB-IOT device; and a device adding module configured to add the NB-IOT device to the device management list based on the paging information.

In some embodiments, the target device information includes at least one of followings:

a device identifier of the NB-IOT device, identifier information related to the target terminal, information of geographical position where the NB-IOT device is currently located, working frequency band information of the NB-IOT device, and a device type of the NB-IOT device.

According to a seventh aspect of the embodiments of the present disclosure, there is provided a computer readable storage medium, wherein the storage medium stores a computer program for performing the device management method according to the above first aspect.

According to an eighth aspect of the embodiments of the present disclosure, there is provided a computer readable storage medium, wherein the storage medium stores a computer program for performing the device management method according to the above second aspect.

According to a ninth aspect of the embodiments of the present disclosure, there is provided a computer readable storage medium, wherein the storage medium stores a computer program for performing the device management method according to any one of the above third aspect.

According to a tenth aspect of the embodiments of the present disclosure, there is provided a device management apparatus, wherein the apparatus is applied in a Narrow Band Internet of Things (NB-IOT) device, and includes:

a processor; and a memory for storing instructions executable by the processor;

wherein the processor is configured to:

receive a management control instruction of a target terminal for the NB-IOT device forwarded by the base station, the target terminal being a terminal for managing the NB-IOT device; and perform an operation corresponding to the management control instruction.

According to an eleventh aspect of the embodiments of the present disclosure, there is provided a device management apparatus, wherein the apparatus is applied in a base station, and includes:

a processor; and a memory for storing instructions executable by the processor;

wherein the processor is configured to:

receive a management control instruction of a target terminal for a NB-IOT device, wherein the target terminal is a terminal for managing the NB-IOT device, and the management control instruction carries a device identifier of the NB-IOT device; and forward the management control instruction to the NB-IOT device according to the device identifier, so that the NB-IOT device performs an operation corresponding to the management control instruction.

According to a twelfth aspect of the embodiments of the present disclosure, there is provided a device management apparatus, wherein the apparatus is applied in a terminal, and includes:

a processor; and a memory for storing instructions executable by the processor;

wherein the processor is configured to:

determine, in a device management list, a NB-IOT device needing a management control currently, the device management list being a device list of all devices managed by the terminal;

generate a management control instruction for managing the NB-IOT device, the management control instruction carrying a device identifier of the NB-IOT device; and send the management control instruction to a base station, so that the base station forwards the management control instruction to the NB-IOT device according to the device identifier, and the NB-IOT device performs an operation corresponding to the management control instruction.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of various embodiments the present disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

The terms used in the present disclosure only tend to depict specific embodiments, rather than restricting the present disclosure. Unless the exceptional case in which the context clearly gives supports, the singular forms "a", "an", and "the" used in the present disclosure and accompany claims are intended to include the plural forms. It should also be appreciated that the expression "and/or" used herein indicates including any and all possible combinations of one or more of the associated listed items.

It should be understood, although terms first, second, third and the like are used in the present disclosure to depict various information, such information is not restricted by these terms. These terms are only used to distinguish information of the same type from each other. For example, without departing from the scope of the present disclosure, the first information may also be referred to as the second information. Similarly, the second information may also be referred to as the first information. Depending on context, the word "if" used herein may be explained to "when" or "upon" or "in response to determining . . . ."

Figure 1:
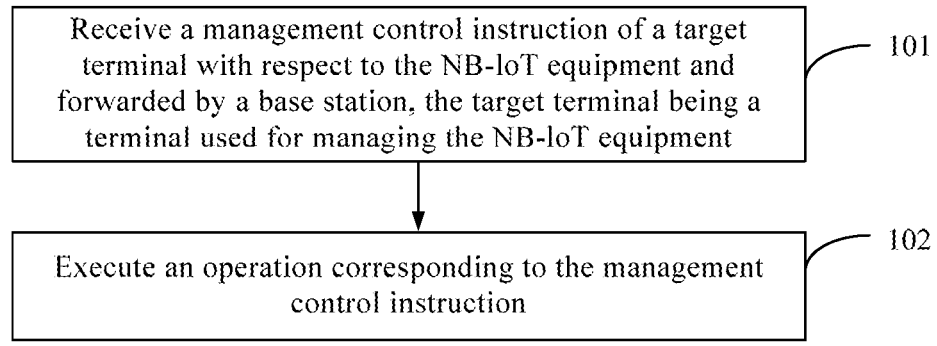
FIG. 1 is a flowchart of a device management method according to some embodiments.

The present disclosure provides a device management method that can be used for NB-IOT devices, such as smart meters, smart printers, smart health medical devices, and the like. Referring to FIG. 1 which shows a flowchart of a device management method according to some embodiments, the method can include the following steps.

In step 101, a management control instruction of a target terminal for the NB-IOT device forwarded by a base station is received, where the target terminal is a terminal for managing the NB-IOT device.

In step 102, an operation corresponding to the management control instruction is performed.

In the foregoing embodiment, the NB-IOT device can receive a management control instruction of the target terminal with respect to the NB-IOT device forwarded by the base station, where the target terminal is a terminal for managing the NB-IOT device. The NB-IOT device directly performs an operation corresponding to the management control instruction. Through the above process, the NB-IOT device can be conveniently and efficiently controlled by the terminal to perform corresponding operations, thereby achieving the purpose of managing the NB-IOT device.

For the above step 101, the target terminal for managing the NB-IOT device can send the management control instruction to the base station, the base station forwards the management control instruction to the NB-IOT device, and then the NB-IOT device directly receives the management control instruction.

For the above step 102, the NB-IOT device can perform a corresponding operation according to the received management control instruction.

For example, if the management control instruction is a power-on control instruction or a power-off control instruction, the NB-IOT device can automatically perform a power-on operation or a power-off operation according to the management control instruction.

For another example, if the NB-IOT device is a smart meter, and the management control instruction is a recharge instruction, then the NB-IOT device automatically completes the recharge operation according to the management control instruction; and if the NB-IOT device is a smart printer, the management control instruction is a file print instruction, then the NB-IOT device can automatically complete the file printing operation after receiving the management control instruction.

According to some embodiments, the foregoing device management method can be described with reference to FIG. 2.

Figure 2:
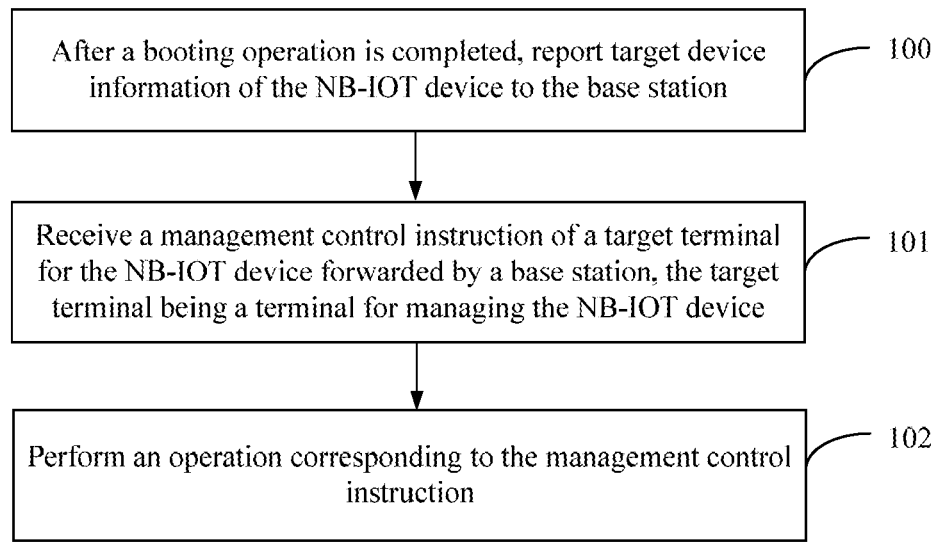
FIG. 2 is a flowchart of another device management method according to some embodiments.

FIG. 2 is a flowchart of a device management method based on the embodiment shown in FIG. 1. Prior to performing step 101, the method can further include the following steps.

In step 100, after a booting operation is completed, target device information of the NB-IOT device is reported to the base station.

In some embodiments, the target device information can include at least one of the following:

a device identifier of the NB-IOT device, identifier information related to the target terminal, information of geographical position where the NB-IOT device is currently located, working frequency band information of the NB-IOT device, and a device type of the NB-IOT device.

The NB-IOT device can obtain the target device information by using the following manners.

The device identifier of the NB-IOT device can be a Media Access Control (MAC) address, a device serial number of the NB-IOT device, or the like. The NB-IOT device can directly find the stored device identifier of itself according to the related technology.

The identifier information related to the target terminal can include: a mobile phone number of the target terminal, an International Mobile Equipment Identity (IMEI) of the target terminal, a Subscriber Identification Module (SIM) of the target terminal, or the like. The identifier information related to the target terminal can be stored in the NB-IOT device in advance, and the NB-IOT device can directly acquire the identifier information related to the target terminal.

The NB-IOT device can acquire its own geographical position information through a Global Positioning System (GPS). Alternatively, the NB-IOT device can determine its own geographical position information by using an identifier of a gateway device that the NB-IOT device currently accesses, for example, if the NB-IOT device accesses a certain user's home router, it can be determined that the NB-IOT device is currently located in the user's home.

In general, each NB-IOT device operates in a fixed frequency band. In the embodiments of the present disclosure, the NB-IOT device can detect information of the frequency band in which the data is received or transmitted during the operation of the NB-IOT device, thereby obtaining the working frequency band information of the NB-IOT device.

The NB-IOT device can determine a device type to which it belongs according to its own device information. For example, the device type can be a smart meter reading, a wearable device, a monitoring alarm system, or an intelligent logistics.

In this step, the NB-IOT device can automatically report the obtained target device information to the base station after completing the power-on operation, and the base station determines, according to the target device information, the target terminal for managing the NB-IOT device, and then sends paging information carrying the target device information to the target terminal. The target terminal can add the NB-IOT device to the device management list based on the paging information, where the device management list is a device list of all devices managed by the terminal.

Through the above process, after the NB-IOT device completes the booting operation, the NB-IOT device can be automatically added to the device management list of the target terminal, so that the NB-IOT device can be managed and controlled through the terminal later, which is easy to be implemented and has a high availability.

Figure 3:
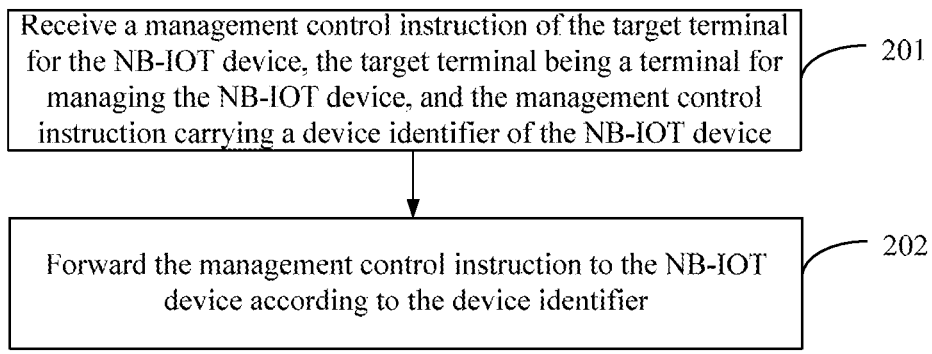
FIG. 3 is a flowchart of another device management method according to some embodiments.

The present disclosure also provides a device management method that can be applied in a base station. FIG. 3 is a flowchart of another device management method according to some embodiments, which can include the following steps.

In step 201, a management control instruction of the target terminal for the NB-IOT device is received, where the target terminal is a terminal for managing the NB-IOT device, and the management control instruction carries a device identifier of the NB-IOT device.

In step 202, the management control instruction is forwarded to the NB-IOT device according to the device identifier, so that the NB-IOT device performs an operation corresponding to the management control instruction.

In the above embodiment, after receiving the management control instruction of the target terminal with respect to the NB-IOT device, the base station directly forwards the management control instruction to the NB-IOT device based on the device identifier of the NB-IOT device carried in the management control instruction. Through the above process, the base station only needs to forward the management control instruction to the corresponding NB-IOT device, which is simple and convenient.

For the above step 201, the base station directly receives the management control instruction of the target terminal with respect to the NB-IOT device. The target terminal is a terminal for managing the NB-IOT device. In order to facilitate the base station to forward the management control instruction, the management control instruction further carries the device identifier of the NB-IOT device.

For the above step 202, the base station finds a corresponding NB-IOT device according to the device identifier, and forwards the management control instruction to the NB-IOT device.

It should be noted that, in the embodiments of the present disclosure, the base station can not only interact with the terminal, but also interact with the NB-IOT device, so as to implement the purpose of controlling the NB-IOT device through the terminal.

In some embodiments, the foregoing device management method can be described with reference to FIG. 4.

Figure 4:
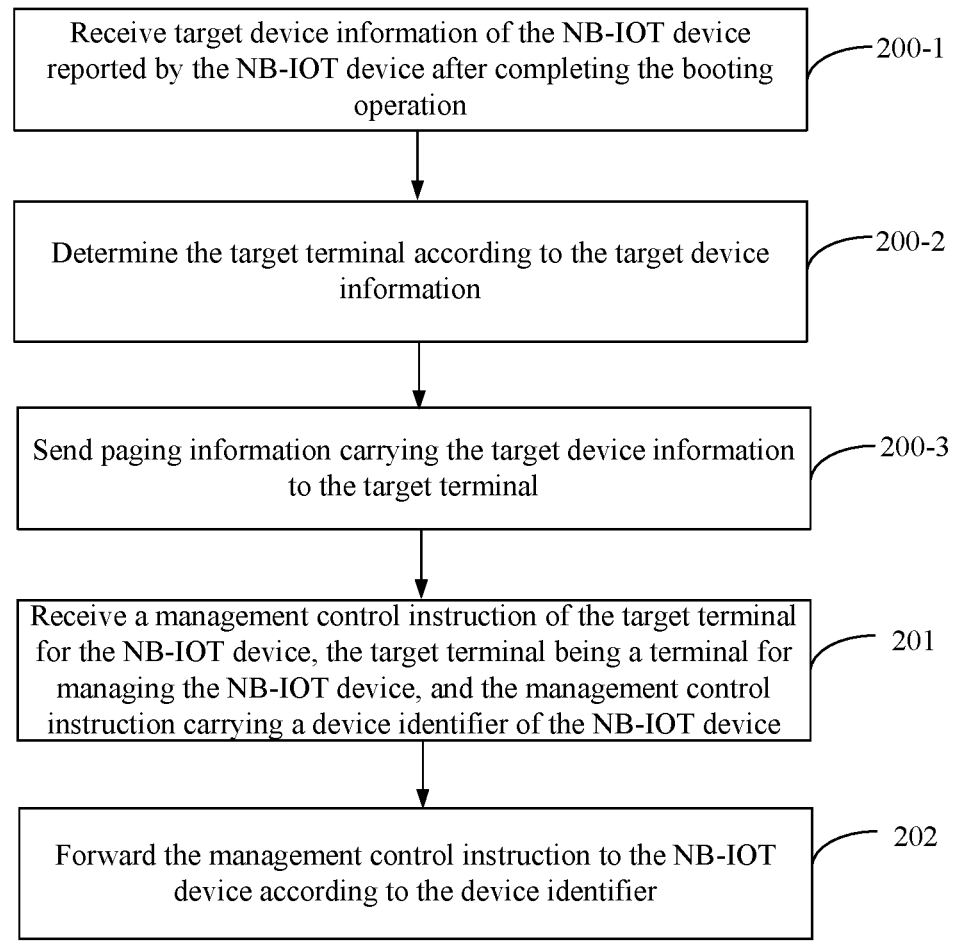
FIG. 4 is a flowchart of another device management method according to some embodiments.

FIG. 4 is a flowchart of a device management method based on the embodiment shown in FIG. 3. Prior to performing step 201, the method can also include the following steps.

In step 200-1, target device information of the NB-IOT device reported by the NB-IOT device after completing the booting operation is received.

In this step, the NB-IOT device automatically obtains its own target device information after completing the booting operation, further, the NB-IOT device reports it to the base station, and the base station directly receives the target device information.

In some embodiments, the target device information includes at least one of the following:
a device identifier of the NB-IOT device, identifier information related to the target terminal, information of geographical position where the NB-IOT device is currently located, working frequency band information of the NB-IOT device, and a device type of the NB-IOT device.

In step 200-2, a target terminal is determined according to the target device information.

In this step, the base station can automatically search for a target terminal for managing the NB-IOT device based on the target device information reported by the NB-IOT device.

In step 200-3, paging information carrying the target device information is sent to the target terminal, so that the target terminal adds the NB-IOT in a device management list based on the paging information. The device management list is a device list of all devices managed by the terminal.

In this step, after the base station finds the target terminal, it sends paging information to the target terminal, and after receiving the paging information, the target terminal determines that the NB-IOT device currently managed by itself completes the power-on operation, and can add the NB-IOT device to the device management list for subsequent control management of the NB-IOT device.

The paging information further carries the device identifier of the NB-IOT device. Therefore, the target terminal can add the NB-IOT device to the device management list based on the device identifier.

In the foregoing embodiment, the base station notifies the terminal through the paging message that the terminal can currently perform management control on the NB-IOT device, thereby avoiding the problem that the NB-IOT device in the 5G system is disconnected from the user management.

According to some embodiments, the foregoing step 200-2 can be described with reference to FIG. 5.

Figure 5:
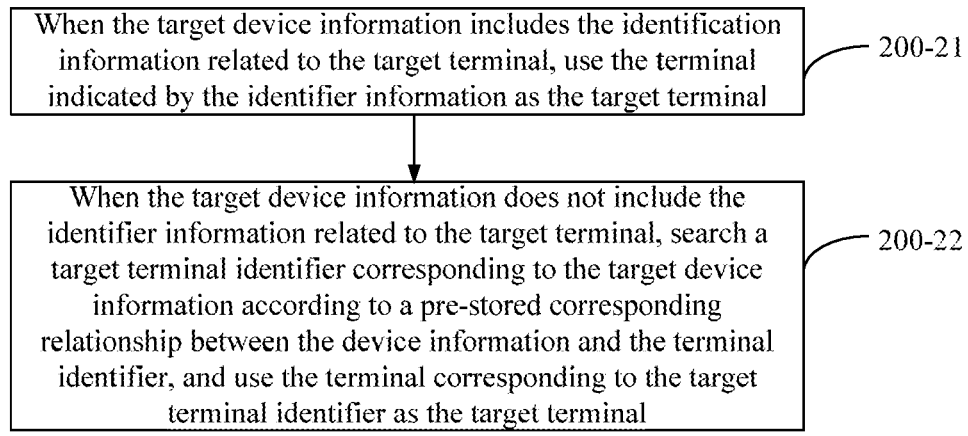
FIG. 5 is a flowchart of another device management method according to some embodiments.

FIG. 5 is a flowchart of a device management method based on the embodiment shown in FIG. 4, and the method can include the following steps.

In step 200-21, when the target device information includes the identification information related to the target terminal, the terminal indicated by the identifier information is used as the target terminal.

In this step, if the target device information includes the identifier information related to the target terminal, the base station directly uses the terminal indicated by the identifier information as the target terminal.

In step 200-22, when the target device information does not include the identifier information related to the target terminal, a target terminal identifier corresponding to the target device information is searched according to a pre-stored corresponding relationship between the device information and the terminal identifier, and the terminal corresponding to the target terminal identifier is used as the target terminal.

In this step, if the target device information does not include the identifier information related to the target terminal, the target terminal identifier corresponding to the target device information can be searched according to the above corresponding relationship prestored by the base station, therefore the terminal corresponding to the target terminal identifier is used as the target terminal. The corresponding relationship can be synchronized by a cloud server to the base station. In some embodiments, the cloud server establishes the foregoing corresponding relationship according to a network transaction record, a preset binding relationship between the NB-IOT device and the terminal, or the geographical location information of the NB-IOT device.

For example, the cloud server determines, according to the network transaction record, that the NB-IOT device 1 is purchased through a certain terminal A, then the cloud server can establish a corresponding relationship between a device identifier of the NB-IOT device 1 and a terminal identifier of the terminal A.

For another example, the binding relationship between a terminal B and the NB-IOT device 2 is pre-stored on the cloud server, then the cloud server can establish a corresponding relationship between a device identifier of the NB-IOT device 2 and the terminal identifier of the terminal B. Or, if the cloud server determines that the NB-IOT device currently accesses a user home router according to the geographic location information of the NB-IOT device, and the terminal C accesses the router at the same time, then the cloud server can establish a corresponding relationship between the terminal identifier of the terminal C and the device identifier of the NB-IOT device.

In the foregoing embodiments, when determining, by the base station, the target terminal for managing the NB-IOT device according to the target device information reported by the NB-IOT device, optionally, if the target device information includes the identifier information related to the target terminal, then the terminal indicated by the identifier information is the target terminal; and if the target device information does not include the identifier information related to the target terminal, then the base station can find the target terminal identifier corresponding to the target device information according to the pre-stored corresponding relationship between the device information and the terminal identifier, and the terminal corresponding to the target terminal identifier is the target terminal. Through the above process, the target terminal for managing the NB-IOT device can be quickly determined by the base station, so that the NB-IOT device can be managed later.

Figure 6:
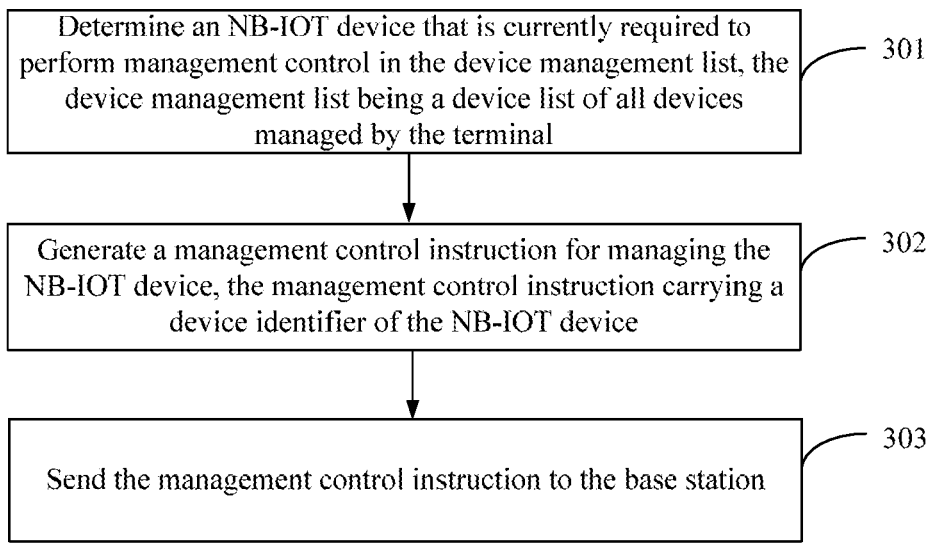
FIG. 6 is a flowchart of another device management method according to some embodiments.

Various embodiments of the present disclosure also provide a device management method, which can be applied in a terminal, for example, a smartphone, a tablet, a Personal Digital Assistant (PDA), and the like. FIG. 6 is a flowchart of another device management method according to some embodiments, which can include the following steps.

In step 301, an NB-IOT device that is currently required to perform management control is determined in the device management list, where the device management list is a device list of all devices managed by the terminal.

In step 302, a management control instruction for managing the NB-IOT device is generated, where the management control instruction carries a device identifier of the NB-IOT device.

In step 303, the management control instruction is sent to the base station, so that the base station forwards the management control instruction to the NB-IOT device according to the device identifier, and the NB-IOT device performs an operation corresponding to the management control instruction.

In the foregoing embodiments, after the terminal determines, in the device management list, the NB-IOT device that the user needs to perform management control, the terminal can automatically generate a management control instruction, and send the management control instruction to the base station. The base station can forward the management control instruction to the NB-IOT device, and the NB-IOT device performs the corresponding operation. Through the above process, the user can send the management control instruction to the NB-IOT device through the terminal, and control the NB-IOT device to perform corresponding operations, thereby achieving the purpose of managing the NB-IOT device.

Figure 7A:
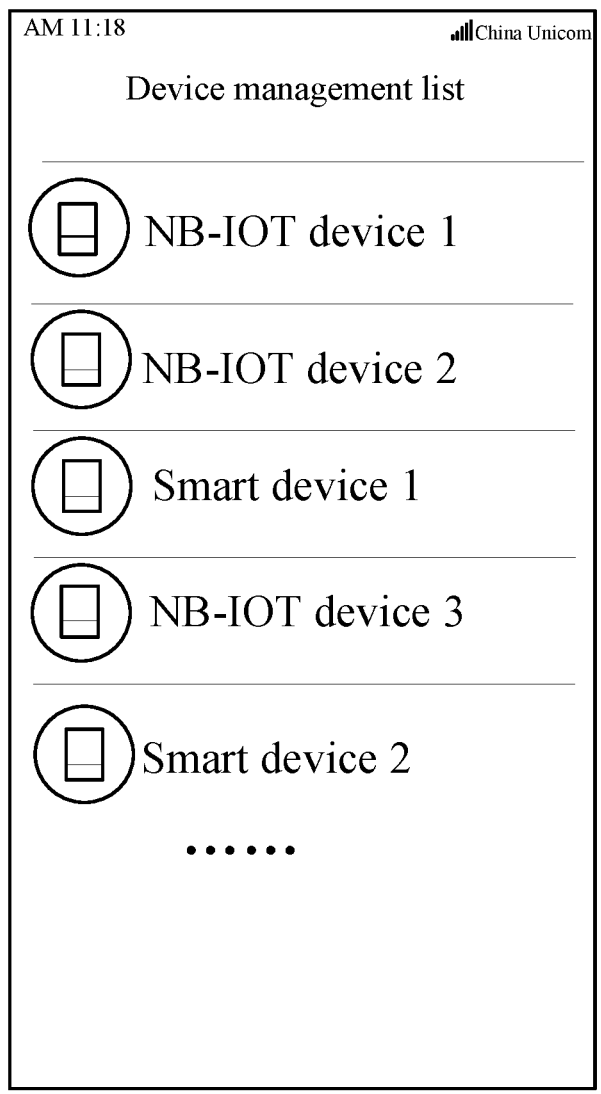
FIG. 7A is a schematic diagram of a device management scenario according to some embodiments.
Figure 7B:
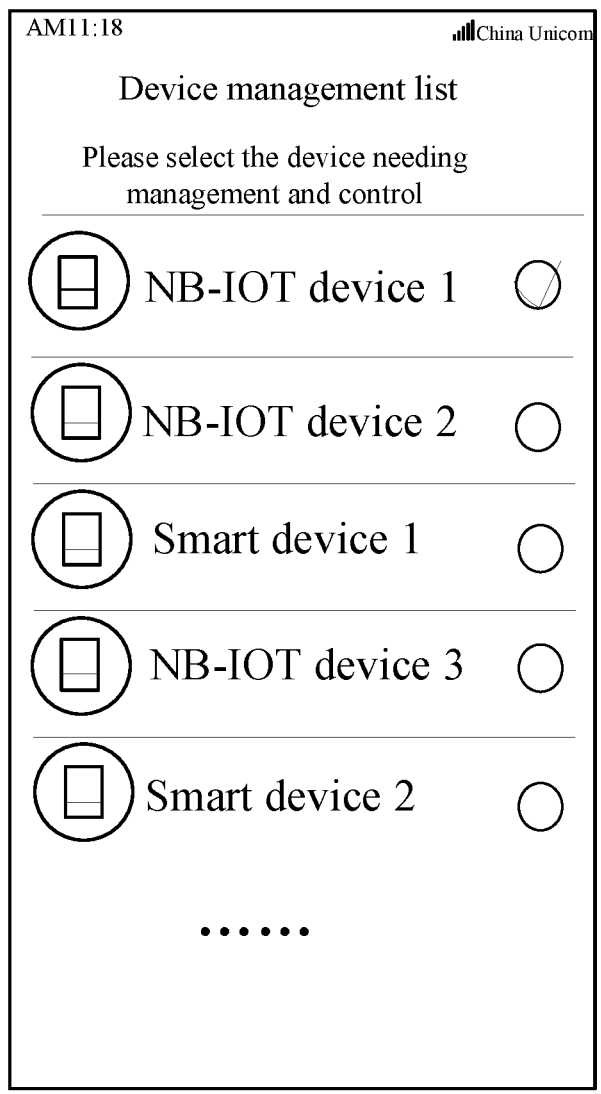
FIG. 7B is a schematic diagram of another device management scenario according to some embodiments.

For the above step 301, the terminal can output a device management list, for example, as shown in FIG. 7A, the device management list is a device list of all devices managed by the terminal, and the device management list can also include other smart devices that can be managed and controlled by the terminal in addition to the NB-IOT device. The user can select an NB-IOT device that needs to perform management control from the device management list, for example, as shown in FIG. 7B. At this time, the terminal can automatically determine the NB-IOT device that needs to perform management control currently according to the user's selection.

Figure 8:
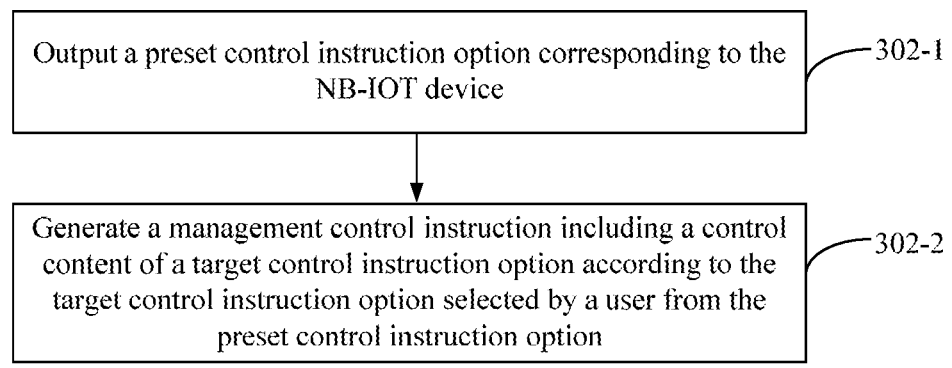
FIG. 8 is a flowchart of another device management method according to some embodiments.

For the above step 302, optionally, as shown in FIG. 8 that is a flowchart of another device management method illustrated based on the embodiment shown in FIG. 6, the step 302 can include the following steps.

In step 302-1, a preset control instruction option corresponding to the NB-IOT device is outputted.

Figure 9A:
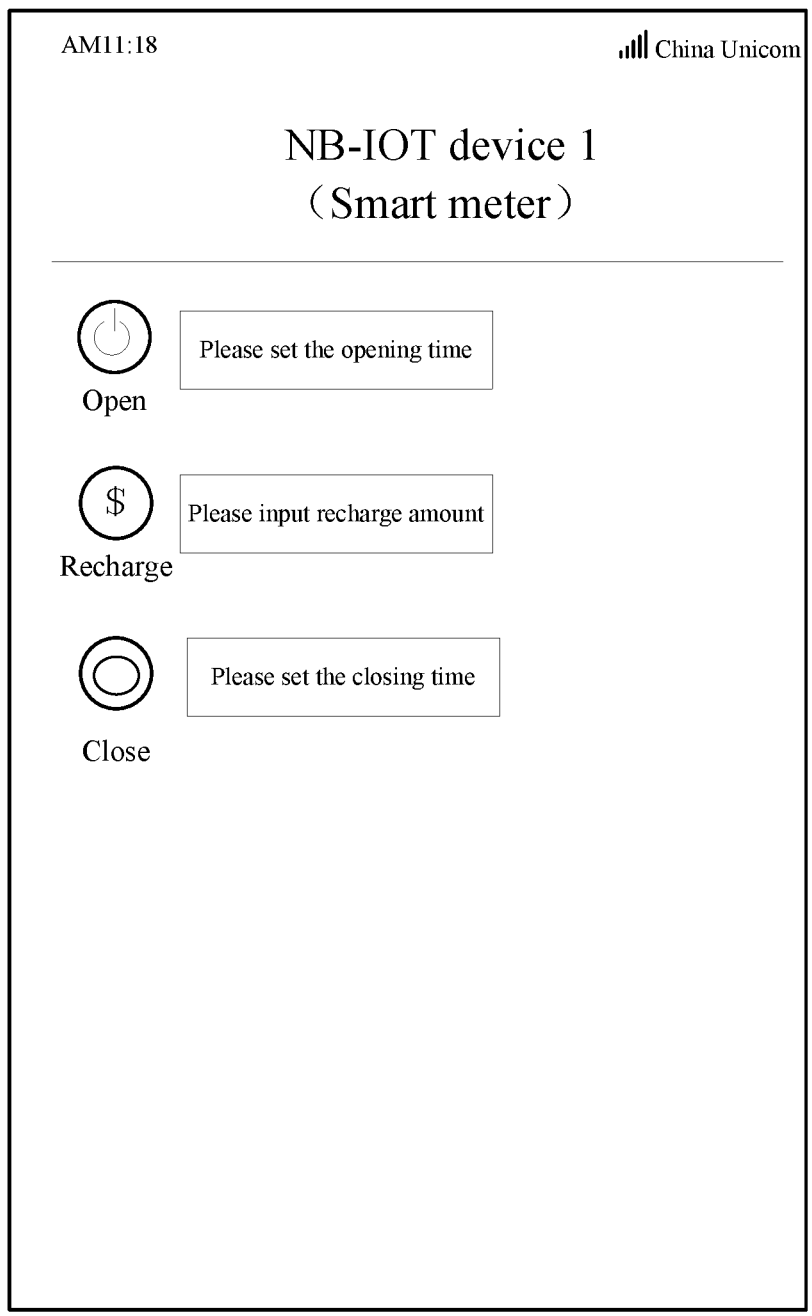
FIG. 9A is a schematic diagram of a device management scenario for a smart electric meter according to some embodiments.
Figure 9B:
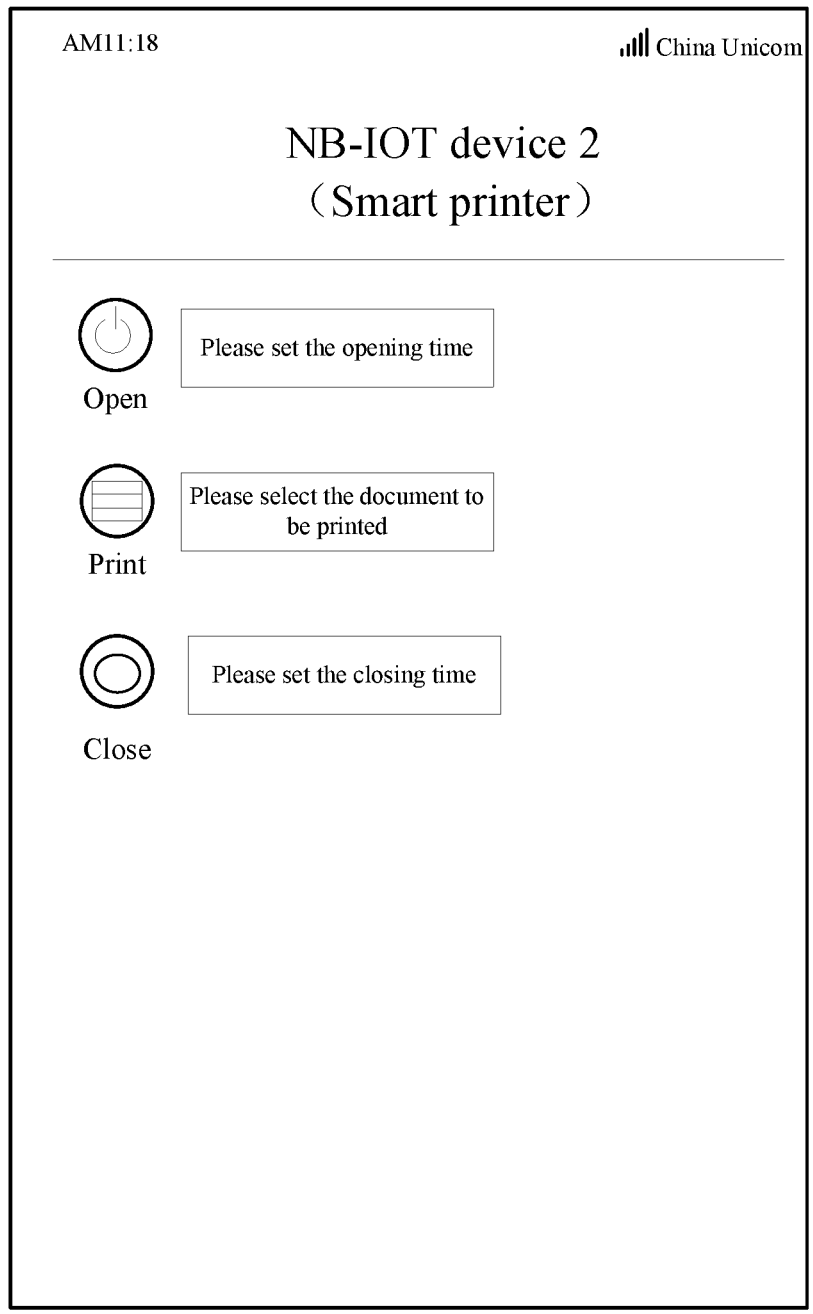
FIG. 9B is a schematic diagram of a device management scenario for a smart printer according to some embodiments.

In this step, the terminal can output a preset control instruction option corresponding to the NB-IOT device. For example, when the NB-IOT device is a smart meter, the preset control instruction option can be as shown in FIG. 9A. When the NB-IOT device is a smart printer, the preset control instruction option can be as shown in FIG. 9B.

In step 302-2, a management control instruction including a control content of the target control instruction option is generated according to the target control instruction option selected by the user from the preset control instruction option.

In this step, after the user selects the target control instruction option from the preset control instruction option, the user can further input content related to the target control instruction option, for example, when the target control instruction option is recharge, the user can also input an amount of recharge, and when the target control instruction option is booting, the user can also input the time point of booting.

Further, the terminal automatically generates the management control instruction including the control content of the target control instruction option according to the related art. In order to ensure that the base station can correctly forward the management control instruction, the management control instruction can further carry the device identifier of the NB-IOT device.

For the above step 303, the terminal directly sends the generated management control instruction to the base station, and the base station forwards the management control instruction to the NB-IOT device according to the device identifier. After receiving the management control instruction, the NB-IOT device automatically performs an operation corresponding to the management control instruction.

In some embodiments, the foregoing device management method can be described with reference to FIG. 10.

Figure 10:
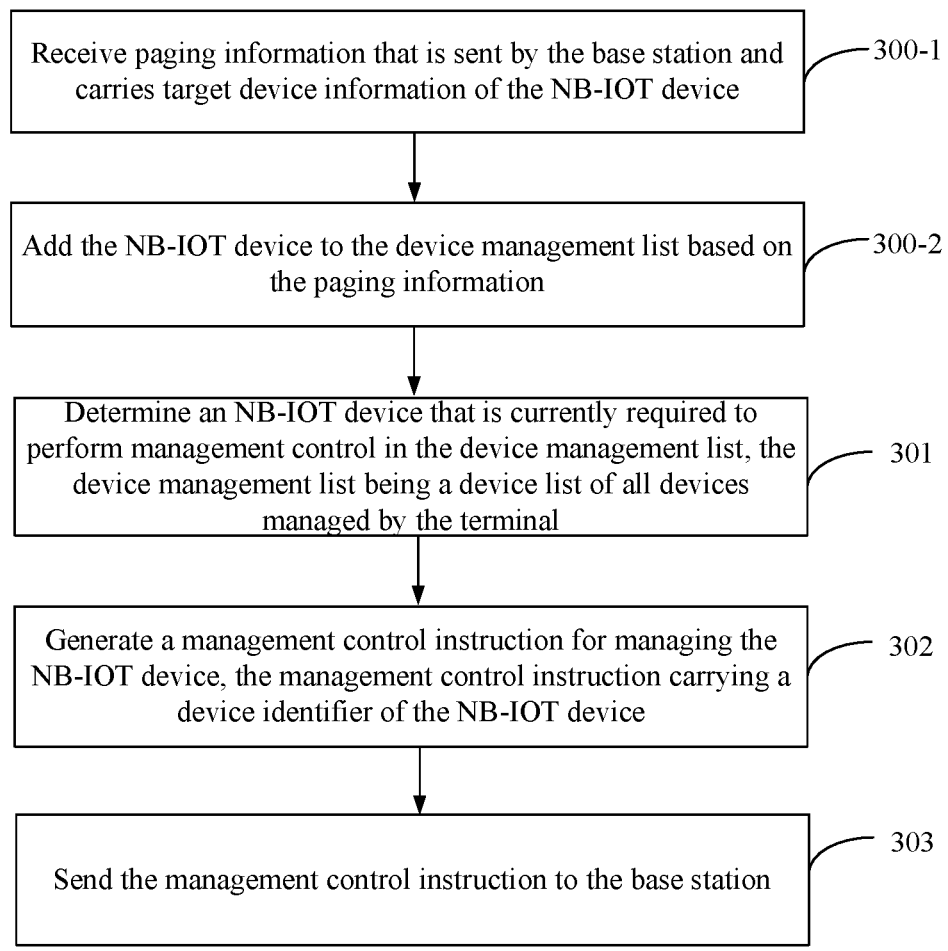
FIG. 10 is a flowchart of another device management method according to some embodiments.

FIG. 10 is a flowchart of another device management method illustrated based on the embodiment shown in FIG. 6. Prior to performing step 301, the method can further include the following steps.

In step 300-1, paging information that is sent by the base station and carries target device information of the NB-IOT device is received.

In this step, after completing the power-on operation, the NB-IOT device can automatically send its own target device information to the base station, and the base station can generate paging information after receiving the target device information and send the paging information to the terminal. After receiving the paging information, the terminal can determine that there is an NB-IOT device that has completed the power-on operation and this NB-IOT device belongs to a device that can be managed and controlled by the terminal itself.

In some embodiments, the target device information includes at least one of the following:

a device identifier of the NB-IOT device, identifier information related to the target terminal, information of geographical position where the NB-IOT device is currently located, working frequency band information of the NB-IOT device, and a device type of the NB-IOT device.

In step 300-2, the NB-IOT device is added to the device management list based on the paging information.

In this step, the terminal can directly add the NB-IOT device to the device management list according to the target device information carried in the paging information, and the terminal can further store the target device information, so that the generation of the management control instruction later can be based on the stored target device information, and the device identifier of the NB-IOT device is carried in the management control instruction, so that the base station forwards the management control instruction to the NB-IOT device according to the device identifier.

In the foregoing embodiment, if the terminal receives the paging information that is sent by the base station and carries the target device information of the NB-IOT device, the target device information being reported by the NB-IOT device to the base station after the power-on operation is completed, then the terminal automatically adds the NB-IOT device to the device management list based on the paging information. Through the above process, after the NB-IOT device is powered on, the terminal automatically adds the device to the device management list, which eliminates the need for manual operation, improves the user experience, and prevents the NB-IOT device in the 5G system from being disconnected from the user management.

Figure 11:
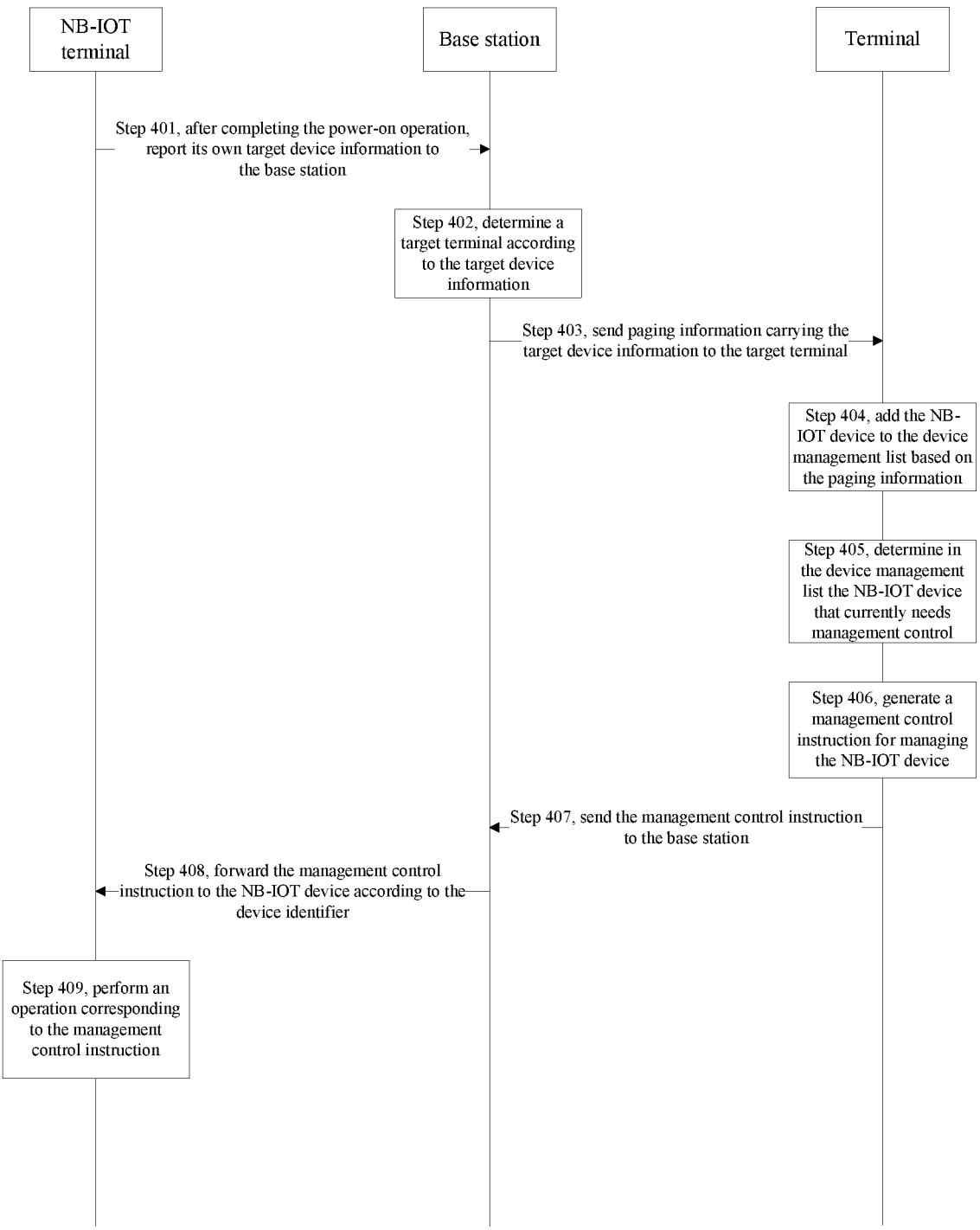
FIG. 11 is a flowchart of another device management method according to some embodiments.

The present disclosure also provides a device management method. Referring to FIG. 11 that is a flowchart of another device management method according to some embodiments, the method can include the following steps.

In step 401, after completing the power-on operation, the NB-IOT device reports its own target device information to the base station.

In some embodiments, the target device information includes at least one of the following:

a device identifier of the NB-IOT device, identifier information related to the target terminal, information of geographical position where the NB-IOT device is currently located, working frequency band information of the NB-IOT device, and a device type of the NB-IOT device.

In step 402, the base station determines a target terminal according to the target device information, where the target terminal is a terminal for managing the NB-IOT device.

In step 403, the base station sends paging information carrying the target device information to the target terminal.

In step 404, the target terminal adds the NB-IOT device to the device management list based on the paging information, where the device management list is a device list of all devices managed by the terminal.

In step 405, the target terminal determines in the device management list the NB-IOT device that currently needs to perform management control.

In step 406, the target terminal generates a management control instruction for managing the NB-IOT device, where the management control instruction carries the device identifier of the NB-IOT device.

In step 407, the target terminal sends the management control instruction to the base station.

In step 408, the base station forwards the management control instruction to the NB-IOT device according to the device identifier.

In step 409, the NB-IOT device performs an operation corresponding to the management control instruction.

In the foregoing embodiment, after completing the power-on operation, the NB-IOT device automatically reports its own target device information to the base station, and after the base station determines the target terminal that is used to manage the NB-IOT device, the base station sends the paging information carrying the target device information to the terminal, and the terminal can add the NB-IOT device to the device management list based on the paging information. Subsequently, the user can perform management control on the NB-IOT device in the device management list through the terminal. The above process can conveniently and efficiently control the NB-IOT device through the terminal to perform corresponding operations, thereby achieving the purpose of managing the NB-IOT device.

For the foregoing method embodiments, for the sake of simple description, they are all expressed as a series of action combinations, but those skilled in the art should understand that the present disclosure is not limited by the described action sequence, because in the present disclosure, certain steps can be performed in other orders or concurrently.

Secondly, those skilled in the art should also understand that the embodiments described in the specification are optional embodiments, and the actions and modules involved are not necessarily required by the present disclosure.

Corresponding to the foregoing method embodiments for implementing application functions, the present disclosure also provides an apparatus for implementing the application functions and an embodiment of a corresponding terminal.

Figure 12:
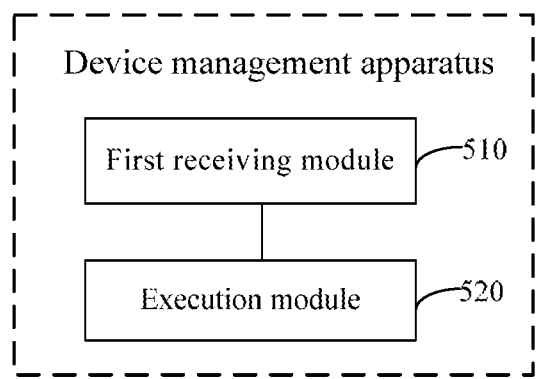
FIG. 12 is a block diagram of a device management apparatus according to some embodiments.

Referring to FIG. 12 that is a block diagram of a device management apparatus according to some embodiments, the apparatus is applied in a Narrow Band Internet of Things (NB-IOT) device, and includes:

a first receiving module 510 configured to receive a management control instruction of the target terminal with respect to the NB-IOT device forwarded by the base station, where the target terminal is a terminal for managing the NB-IOT device; and an execution module 520 configured to perform an operation corresponding to the management control instruction.

The various device components, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Figure 13:
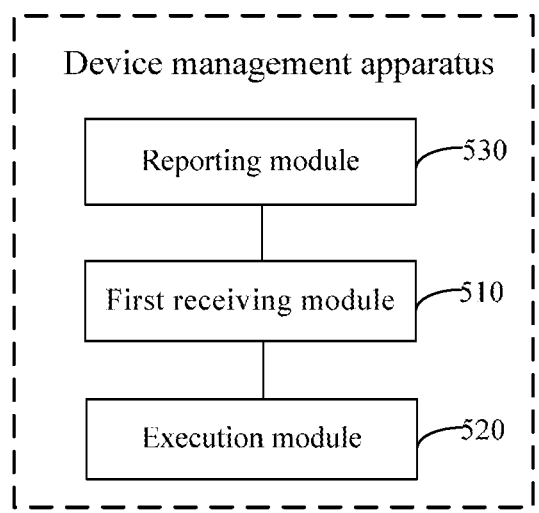
FIG. 13 is a block diagram of another device management apparatus according to some embodiments.

Referring to FIG. 13 that is a block diagram of another device management apparatus illustrated based on the embodiment shown in FIG. 12, the apparatus further includes:

a reporting module 530 configured to, after a power-on operation is completed, report the target device information of the NB-IOT device to the base station, so that the base station sends paging information that carries the target device information to the target terminal after determining the target terminal according to the target device information, and the target terminal adds the NB-IOT device in a device management list based on the paging information, the device management list being a device list of all devices managed by the terminal.

In some embodiments, the target device information includes at least one of the following:

a device identifier of the NB-IOT device, identifier information related to the target terminal, information of geographical position where the NB-IOT device is currently located, working frequency band information of the NB-IOT device, and a device type of the NB-IOT device.

Figure 14:
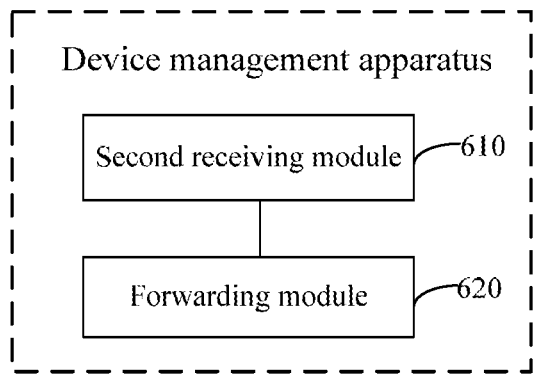
FIG. 14 is a block diagram of another device management apparatus according to some embodiments.

FIG. 14 is a block diagram of another device management apparatus according to some embodiments. Referring to FIG. 14, the apparatus is applied in a base station, and includes:

a second receiving module 610 configured to receive a management control instruction of the target terminal with respect to the NB-IOT device, where the target terminal is a terminal for managing the NB-IOT device, and the management control instruction carries a device identifier of the NB-IOT device; and a forwarding module 620 configured to forward the management control instruction to the NB-IOT device according to the device identifier, so that the NB-IOT device performs an operation corresponding to the management control instruction.

Figure 15:
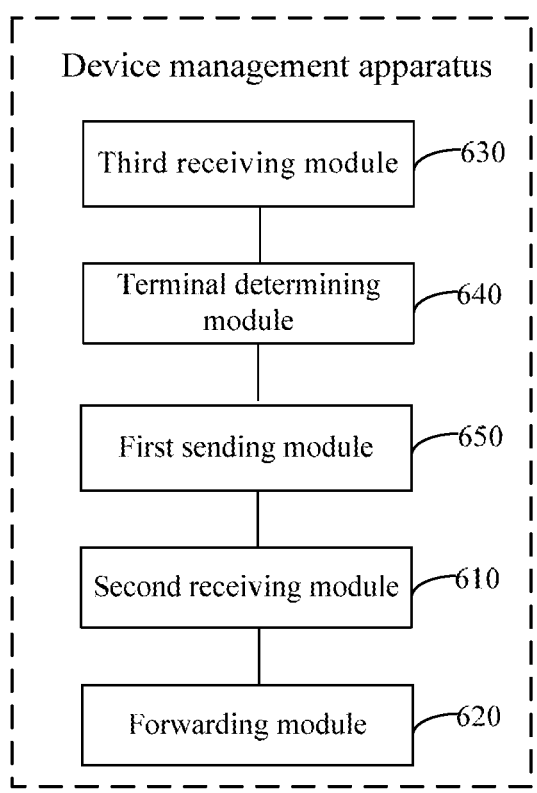
FIG. 15 is a block diagram of another device management apparatus according to some embodiments.

FIG. 15 is a block diagram of another device management apparatus illustrated based on the embodiment shown in FIG. 14. Referring to FIG. 15, the apparatus further includes:

a third receiving module 630 configured to receive the target device information of the NB-IOT device that is reported after the booting operation is completed;

a terminal determining module 640 configured to determine the target terminal according to the target device information; and a first sending module 650 configured to send paging information carrying the target device information to the target terminal, so that the target terminal adds the NB-IOT device to the device management list based on the paging information, the device management list being a device list of all devices managed by the terminal.

In some embodiments, the target device information includes at least one of the following:

a device identifier of the NB-IOT device, identifier information related to the target terminal, information of geographical position where the NB-IOT device is currently located, working frequency band information of the NB-IOT device, and a device type of the NB-IOT device.

Figure 16:
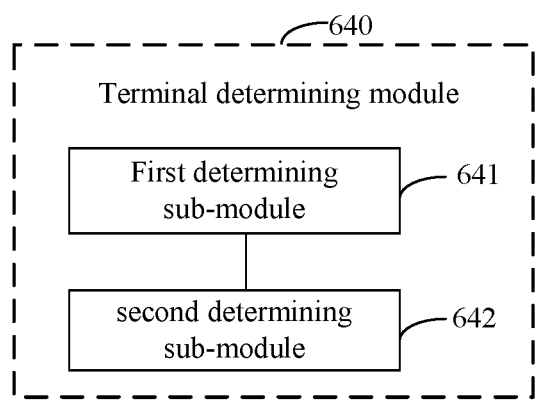
FIG. 16 is a block diagram of another device management apparatus according to some embodiments.

FIG. 16 is a block diagram of another device management apparatus illustrated based on the embodiment shown in FIG. 15. Referring to FIG. 16, the terminal determining module 640 includes:

a first determining sub-module 641 configured to, when the target device information includes the identifier information related to the target terminal, use a terminal indicated by the identifier information as the target terminal; and a second determining sub-module 642 configured to, when the target device information does not include the identifier information related to the target terminal, search for a target terminal identifier corresponding to the target device information according to a pre-stored corresponding relationship between the device information and the terminal identifier, and use a terminal corresponding to the target terminal identifier as the target terminal.

Figure 17:
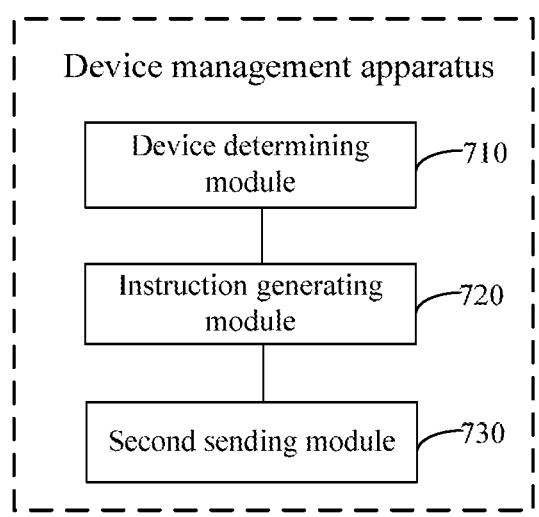
FIG. 17 is a block diagram of another device management apparatus according to some embodiments.

FIG. 17 is a block diagram of another device management apparatus according to some embodiments. Referring to FIG. 17, the apparatus is used in a terminal, and includes:

a device determining module 710 configured to determine, in a device management list, an NB-IOT device that needs to perform management control currently, where the device management list is a device list of all devices managed by the terminal;

an instruction generating module 720 configured to generate a management control instruction for managing the NB-IOT device, where the management control instruction carries a device identifier of the NB-IOT device; and a second sending module 730 configured to send the management control instruction to a base station, so that the base station forwards the management control instruction to the NB-IOT device according to the device identifier, and the NB-IOT device performs an operation corresponding to the management control instruction.

Figure 18:
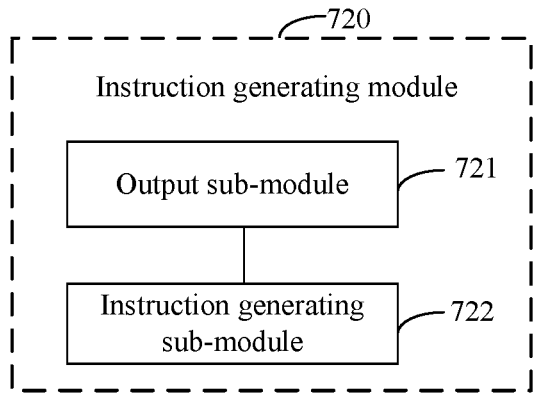
FIG. 18 is a block diagram of another device management apparatus according to some embodiments.

FIG. 18 is a block diagram of another device management apparatus illustrated based on the embodiment shown in FIG. 17. Referring to FIG. 18, the instruction generating module 720 includes:

an output sub-module 721 configured to output a preset control instruction option corresponding to the NB-IOT device; and an instruction generating sub-module 722 configured to, according to a target control instruction option selected by a user from the preset control instruction option, generate a management control instruction including a control content of the target control instruction option.

Figure 19:
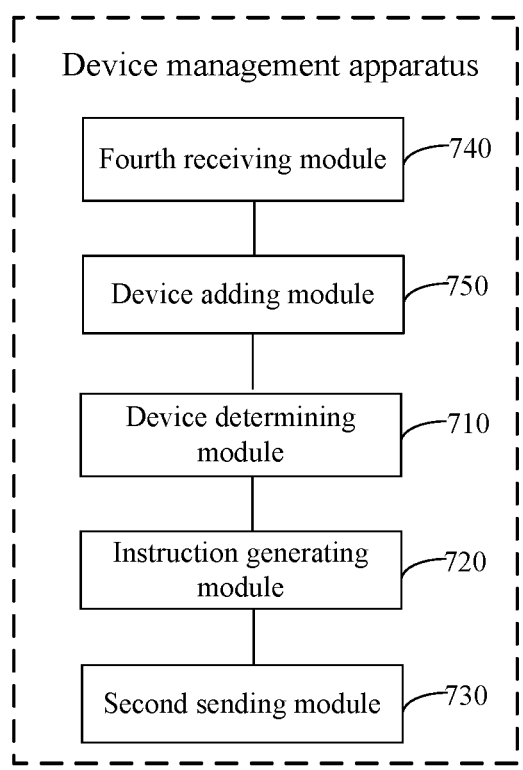
FIG. 19 is a block diagram of another device management apparatus according to some embodiments.

FIG. 19 is a block diagram of another device management apparatus illustrated based on the embodiment shown in FIG. 17. Referring to FIG. 19, the apparatus further includes:

a fourth receiving module 740 configured to receive paging information that is sent by the base station and carries target device information of the NB-IOT device; and a device adding module 750 configured to add the NB-IOT device in the device management list based on the paging information.

In some embodiments, the target device information includes at least one of the following:

a device identifier of the NB-IOT device, identifier information related to the target terminal, information of geographical position where the NB-IOT device is currently located, working frequency band information of the NB-IOT device, and a device type of the NB-IOT device.

For the embodiments regarding apparatuses, since they basically correspond to the embodiments regarding methods, they may be referred to the description of the embodiments regarding methods. The embodiments regarding apparatuses described above are merely illustrative. The units described as separate components may be or may not be physically separate, and the components illustrated as units may be or may not be physical units, and may be at the same location, or may be distributed to multiple units over the network. A part of or the whole of the modules may be selected to achieve the objective of the solutions of the present disclosure as desired. One skilled in the art may understand and practice the embodiments without paying any creative labor.

Correspondingly, an embodiment of the present disclosure further provides a computer readable storage medium, and the storage medium stores a computer program for executing any of the above-mentioned device management methods used in the NB-IOT device.

Correspondingly, an embodiment of the present disclosure further provides a computer readable storage medium, and the storage medium stores a computer program for executing any of the above-mentioned device management methods used in the base station.

Correspondingly, an embodiment of the present disclosure further provides a computer readable storage medium, and the storage medium stores a computer program for executing any of the any of the above-mentioned device management methods used in the terminal.

Correspondingly, an embodiment of the present disclosure further provides a device management apparatus applied in a Narrow Band Internet of Things (NB-IOT) device, including:

a processor; and a memory for storing instructions executable by the processor;

wherein the processor is configured to:

receive a management control instruction of a target terminal for the NB-IOT device forwarded by the base station, the target terminal being a terminal for managing the NB-IOT device; and perform an operation corresponding to the management control instruction.

Figure 20:
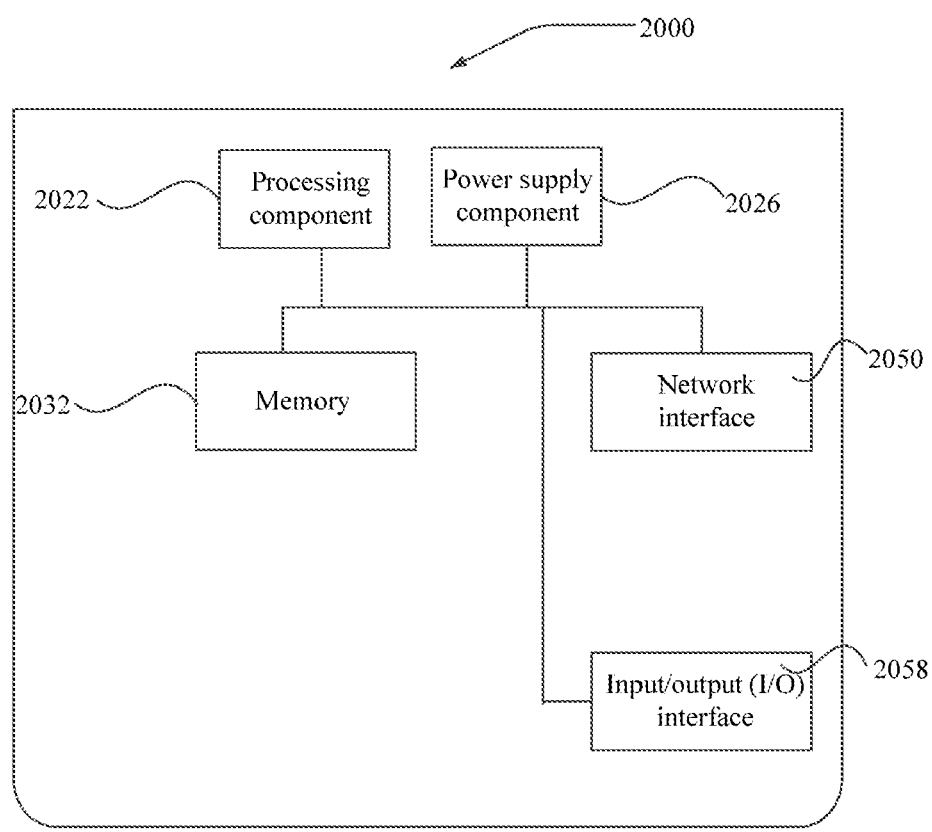
FIG. 20 is a schematic structural diagram of a device management apparatus according to some embodiments of the present disclosure.

FIG. 20 is a schematic structural diagram of a device management apparatus 2000 according to some embodiments. For example, the apparatus 2000 can be an NB-IOT device.

Referring to FIG. 20, the apparatus 2000 includes a processing component 2022 that further includes one or more processors, and a memory resource represented by a memory 2032 for storing instructions executable by the processing component 2022, such as an application. The application stored in memory 2032 can include one or more modules each corresponding to a set of instructions. Further, the processing component 2022 is configured to execute instructions to perform the device management method described above.

The apparatus 2000 can also include a power supply component 2026 configured to perform power management of the apparatus 2000, a wired or wireless network interface 2050 configured to connect the apparatus 2000 to the network, and an input/output (I/O) interface 2058. The apparatus 2000 can operate an operating system stored in the memory 2032, such as Android, IOS, Windows Server™, Mac OS X™, Unix™, Linux™, FreeBSD™ or the like.

When the instructions in the memory 2032 are executed by the processing component 2022, the apparatus 2000 is enabled to perform a device management method, including:

receiving a management control instruction of a target terminal for the NB-IOT device forwarded by the base station, the target terminal being a terminal for managing the NB-IOT device; and performing an operation corresponding to the management control instruction.

Correspondingly, an embodiment of the present disclosure further provides a device management apparatus, applied in a base station, including:

a processor; and a memory for storing instructions executable by the processor;

wherein the processor is configured to:

receive a management control instruction of a target terminal for a NB-IOT device, wherein the target terminal is a terminal for managing the NB-IOT device, and the management control instruction carries a device identifier of the NB-IOT device; and forward the management control instruction to the NB-IOT device according to the device identifier, so that the NB-IOT device performs an operation corresponding to the management control instruction.

Figure 21:
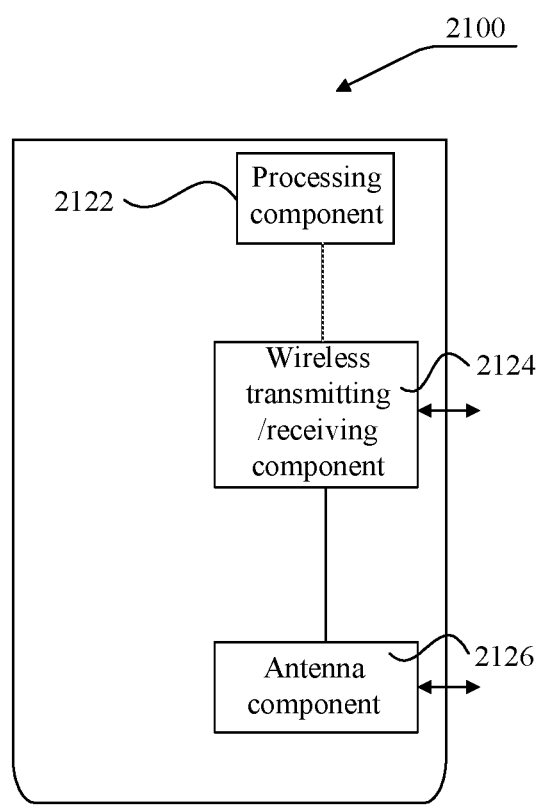
FIG. 21 is a schematic structural diagram of another device management apparatus according to some embodiments of the present disclosure.

FIG. 21 is a schematic structural diagram of a device management apparatus 2100 according to some embodiments. The apparatus 2100 can be provided as a base station. Referring to FIG. 21, the apparatus 2100 includes a processing component 2122, a wireless transmitting/receiving component 2124, an antenna component 2126, and a signal processing portion specific to the wireless interface. The processing component 2122 can further include one or more processors.

One processor in the processing component 2122 can be configured to:

receive a management control instruction of a target terminal for a NB-IOT device, wherein the target terminal is a terminal for managing the NB-IOT device, and the management control instruction carries a device identifier of the NB-IOT device; and forward the management control instruction to the NB-IOT device according to the device identifier, so that the NB-IOT device performs an operation corresponding to the management control instruction.

Correspondingly, the embodiment of the present disclosure further provides a device management apparatus, applied in a terminal, including:

a processor; and a memory for storing instructions executable by the processor;

wherein the processor is configured to:

determine, in a device management list, a NB-IOT device needing a management control currently, the device management list being a device list of all devices managed by the terminal;

generate a management control instruction for managing the NB-IOT device, the management control instruction carrying a device identifier of the NB-IOT device; and send the management control instruction to a base station, so that the base station forwards the management control instruction to the NB-IOT device according to the device identifier, and the NB-IOT device performs an operation corresponding to the management control instruction.

Figure 22:
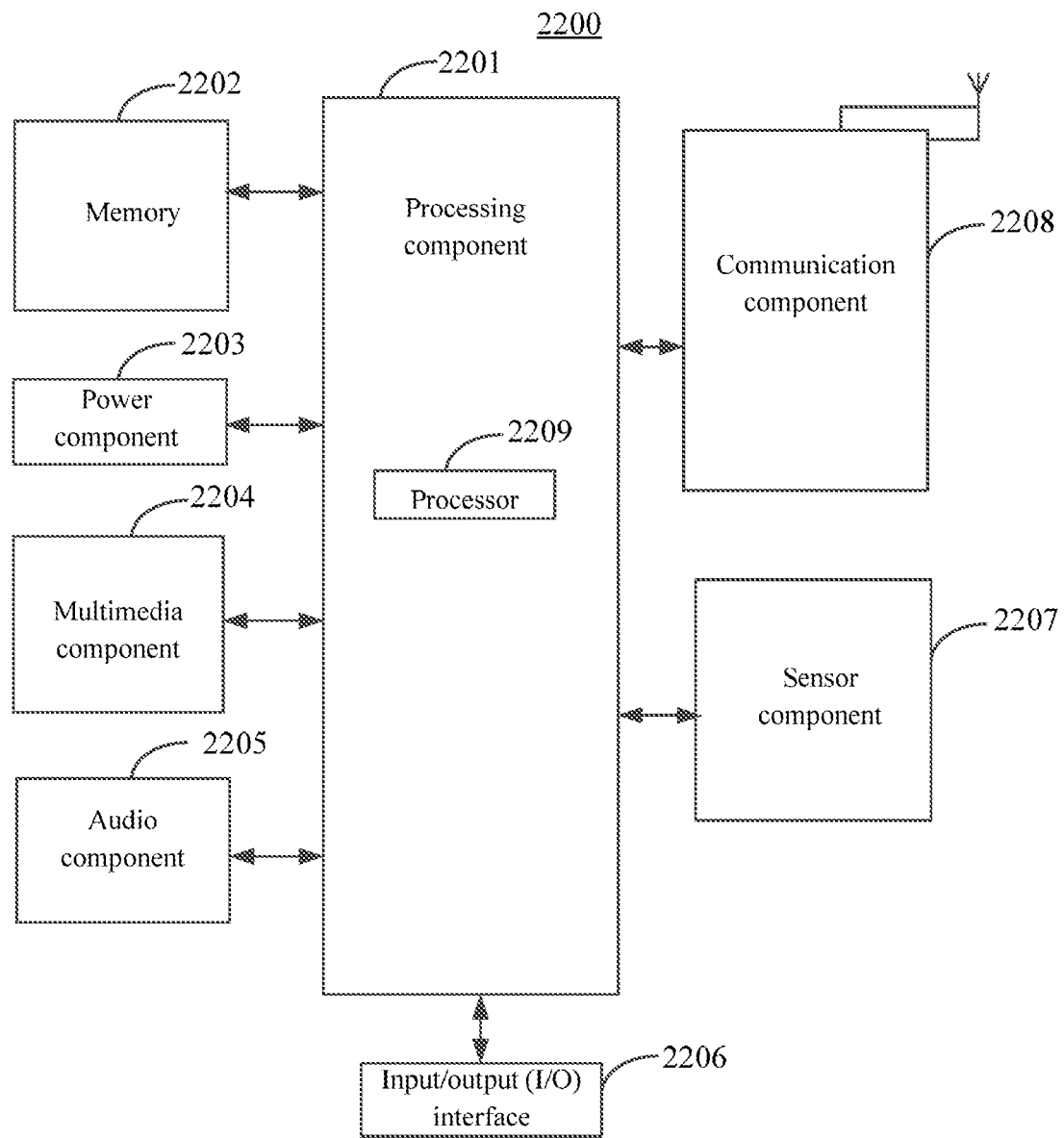
FIG. 22 is a schematic structural diagram of another device management apparatus according to some embodiments of the present disclosure.

FIG. 22 is a schematic structural diagram of a device management apparatus according to some embodiments. As shown in FIG. 22, a device management apparatus 2200 illustrated according to some embodiments can be a computer, a mobile phone, a digital broadcast terminal, a messaging device, a gaming console, a tablet, a medical device, exercise equipment, a personal digital assistant, and the like.

Referring to FIG. 22, the apparatus 2200 can include one or more of the following components: a processing component 2201, a memory 2202, a power component 2203, a multimedia component 2204, an audio component 2205, an input/output (I/O) interface 2206, a sensor component 2207, and a communication component 2208.

The processing component 2201 typically controls overall operations of the apparatus 2200, such as the operations associated with display, telephone calls, data communications, camera operations, and recording operations. The processing component 2201 can include one or more processors 820 to execute instructions to perform all or part of the steps in the above described methods. Moreover, the processing component 2201 can include one or more modules which facilitate the interaction between the processing component 2201 and other components. For instance, the processing component 2201 can include a multimedia module to facilitate the interaction between the multimedia component 2204 and the processing component 2201.

The memory 2202 is configured to store various types of data to support the operation of the apparatus 2200. Examples of such data include instructions for any applications or methods operated on the apparatus 2200, contact data, phonebook data, messages, pictures, video, etc. The memory 2202 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 2203 provides power to various components of the apparatus 2200. The power component 2203 can include a power management system, one or more power sources, and any other components associated with the generation, management, and distribution of power in the apparatus 2200.

The multimedia component 2204 includes a screen providing an output interface between the apparatus 2200 and the user. In some embodiments, the screen can include a liquid crystal display (LCD) and a touch panel (TP). In some embodiments, an organic light-emitting diode (OLED) display or other types of displays can be adopted.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 2204 includes a front camera and/or a rear camera. The front camera and the rear camera can receive an external multimedia datum while the apparatus 2200 is in an operation mode, such as a photographing mode or a video mode. Each of the front camera and the rear camera can be a fixed optical lens system or have focus and optical zoom capability.

The audio component 2205 is configured to output and/or input audio signals. For example, the audio component 2205 includes a microphone ("MIC") configured to receive an external audio signal when the apparatus 2200 is in an operation mode, such as a call mode, a recording mode, and a voice recognition mode. The received audio signal can be further stored in the memory 2202 or transmitted via the communication component 2208. In some embodiments, the audio component 2205 further includes a speaker to output audio signals.

The I/O interface 2206 provides an interface between the processing component 2201 and peripheral interface modules, such as a keyboard, a click wheel, buttons, and the like. The buttons can include, but are not limited to, a home button, a volume button, a starting button, and a locking button.

The sensor component 2207 includes one or more sensors to provide status assessments of various aspects of the apparatus 2200. For instance, the sensor component 2207 can detect an open/closed status of the apparatus 2200, relative positioning of components, e.g., the display and the keypad, of the apparatus 2200, a change in position of the apparatus 2200 or a component of the apparatus 2200, a presence or absence of user contact with the apparatus 2200, an orientation or an acceleration/deceleration of the apparatus 2200, and a change in temperature of the apparatus 2200. The sensor component 2207 can include a proximity sensor configured to detect the presence of nearby objects without any physical contact. The sensor component 2207 can also include a light sensor, such as a CMOS or CCD image sensor, for use in imaging applications. In some embodiments, the sensor component 2207 can also include an accelerometer sensor, a gyroscope sensor, a magnetic sensor, a pressure sensor, or a temperature sensor.

The communication component 2208 is configured to facilitate communication, wired or wirelessly, between the apparatus 2200 and other devices. The apparatus 2200 can access a wireless network based on a communication standard, such as WiFi, 2G, or 3G, or a combination thereof. In one exemplary embodiment, the communication component 2208 receives a broadcast signal or broadcast associated information from an external broadcast management system via a broadcast channel. In one exemplary embodiment, the communication component 2208 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the apparatus 2200 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 2202, executable by a processor 2209 in the apparatus 2200, for performing the above-described methods. For example, the non-transitory computer-readable storage medium can be a ROM, a RAM, a CD-ROM, a magnetic tape, a floppy disc, an optical data storage device, and the like.

When the instructions in the storage medium are executed by the processor, the apparatus 2200 is enabled to perform the above device management methods.

Various embodiments of the present disclosure can have one or more of the following advantages.

In some embodiments of the present disclosure, the NB-IOT device can receive a management control instruction of the target terminal forwarded by the base station with respect to the NB-IOT device, the target terminal being a terminal for managing the NB-IOT device, and the NB-IOT device directly performs an operation corresponding to the management control instruction. Through the above process, the NB-IOT device can be conveniently and efficiently controlled by the terminal to perform corresponding operations, thereby achieving the purpose of managing the NB-IOT device.

In some embodiments of the present disclosure, the NB-IOT device can report the target device information of the NB-IOT device to the base station after completing the booting operation, and further, the base station can determine, according to the target device information, the target terminal for managing the NB-IOT device, and send paging information carrying the target device information to the target terminal. The NB-IOT device is added to the device management list by the target terminal based on the paging information. Through the above process, after the NB-IOT device completes the booting operation, the NB-IOT device is automatically added to the device management list of the target terminal, so that the subsequent management and control of the NB-IOT device through the terminal is convenient, and the availability is high.

In some embodiments of the present disclosure, after receiving the management control instruction of the target terminal with respect to the NB-IOT device, the base station directly forwards the management control instruction to the NB-IOT device based on the device identifier of the NB-IOT device carried in the management control instruction. Through the above process, the base station only needs to forward the management control instruction to the corresponding NB-IOT device, which is simple and convenient.

In some embodiments of the present disclosure, when the base station determines, according to the target device information reported by the NB-IOT device, the target terminal for managing the NB-IOT device, optionally, if the target device information includes the identifier information related to the target terminal, the terminal indicated by the identifier information is the target terminal; and if the target device information does not include the identifier information related to the target terminal, the base station can use the pre-stored corresponding relationship between the device information and the terminal identifier to search for the target terminal identifier corresponding to the target device information, and the terminal corresponding to the target terminal identifier is the target terminal. Through the above process, the target terminal for managing the NB-IOT device can be quickly determined by the base station, so that the NB-IOT device can be managed later.

In some embodiments of the present disclosure, after the terminal determines the NB-IOT device needing to perform management control by the user from the device management list, the terminal can automatically generate a management control instruction, and send the management control instruction to the base station. The base station can forward the management control instruction to the NB-IOT device, and the NB-IOT device performs the corresponding operation. Through the above process, the user can send the management control instruction to the NB-IOT device through the terminal, and control the NB-IOT device to perform corresponding operations, thereby achieving the purpose of managing the NB-IOT device.

In some embodiments of the present disclosure, if the terminal receives the paging information that is sent by the base station and carries the target device information of the NB-IOT device, the target device information being reported to the base station by the NB-IOT device after the booting operation is completed, then the terminal automatically adds the NB-IOT device to the device management list based on the paging information. Through the above process, after the NB-IOT device is powered on, the terminal can automatically add the device to the device management list without manual operation by the user, which improves the user experience, and prevents the NB-IOT device in the 5G system from being disconnected from the user management.

In the present disclosure, it is to be understood that the terms "lower," "upper," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on," a second element may indicate direct contact between the first and second elements, without contact, or indirect through an intermediate medium, unless otherwise explicitly stated and defined.

In the description of the present disclosure, the terms "some embodiments," "example," or "some examples," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described may be combined in a suitable manner in any one or more embodiments or examples. In addition, various embodiments or examples described in the specification, as well as features of various embodiments or examples, may be combined and reorganized.

Implementations of the subject matter and the operations described in this disclosure can be implemented with hardware such as digital electronic circuitry or processing circuits, or in computer software, firmware, or hardware, including the structures disclosed herein and their structural equivalents, or in combinations of one or more of them. Implementations of the subject matter described in this disclosure can be implemented as one or more computer programs, i.e., one or more modules of computer program instructions, encoded or stored on one or more non-transitory computer-readable storage medium for execution by, or to control the operation of, data processing apparatus.

Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them.

Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, drives, or other storage devices). Accordingly, the computer storage medium may be tangible.

The operations described in this disclosure can be implemented as operations performed by a data processing apparatus on data stored on one or more computer-readable storage devices or received from other sources.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombinations.

Moreover, although features can be described above as acting in certain combinations and even initially claimed as such, one or more features from a claimed combination can in some cases be excised from the combination, and the claimed combination can be directed to a subcombination or variations of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A device management method, applied to a Narrow Band Internet of Things (NB-IOT) device, the method comprising:
after a booting operation is completed, reporting target device information of the NB-IOT device to a base station, so that the base station determines a target terminal according to the target device information;
receiving a management control instruction of the target terminal for the NB-IOT device forwarded by the base station, the target terminal being a terminal for managing the NB-IOT device; and
performing an operation corresponding to the management control instruction
wherein the base station determines the target terminal according to the target device information based on:
when the target device information comprises identifier information related to the target terminal, taking a terminal indicated by the identifier information as the target terminal; and
when the target device information does not comprise the identifier information related to the target terminal, searching for a target terminal identifier corresponding to the target device information according to a pre-stored corresponding relationship between the target device information and the terminal identifier, and taking a terminal corresponding to the target terminal identifier as the target terminal.

2. The method according to claim 1, wherein the target device information comprises at least one of:
a device identifier of the NB-IOT device;
identifier information related to the target terminal;
information of geographical position where the NB-IOT device is currently located;
working frequency band information of the NB-IOT device; or
a device type of the NB-IOT device.

3. A communication system implementing the device management method according to claim 1, comprising:
the Narrow Band Internet of Things (NB-IOT) device;
the base station; and
the terminal.

4. The system according to claim 3, wherein the base station is configured to:
receive a management control instruction of a target terminal for a NB-IOT device, wherein the target terminal is a terminal for managing the NB-IOT device, and the management control instruction carries a device identifier of the NB-IOT device; and
forward the management control instruction to the NB-IOT device according to the device identifier, so that the NB-IOT device performs an operation corresponding to the management control instruction.

5. The system according to claim 3, wherein the terminal is configured to:
determine, in a device management list, the NB-IOT device needing a management control currently, the device management list being a device list of all devices managed by the terminal;
generate a management control instruction for managing the NB-IOT device, the management control instruction carrying a device identifier of the NB-IOT device; and
send the management control instruction to a base station, so that the base station forwards the management control instruction to the NB-IOT device according to the device identifier, and the NB-IOT device performs an operation corresponding to the management control instruction.

6. A device management method, applied to a base station, the method comprising:
receiving target device information of a Narrow Band Internet of Things (NB-IOT) device reported by the NB-IOT device after completing a booting operation;
determining a target terminal according to the target device information;
sending paging information carrying the target device information to the target terminal, so that the target terminal adds the NB-IOT device in a device management list based on the paging information, the device management list being a device list of all devices managed by the target terminal;
receiving a management control instruction of the target terminal for the NB-IOT device, wherein the target terminal is a terminal for managing the NB-IOT device, and the management control instruction carries a device identifier of the NB-IOT device; and
forwarding the management control instruction to the NB-IOT device according to the device identifier, so that the NB-IOT device performs an operation corresponding to the management control instruction;

wherein the determining the target terminal according to the target device information comprises:

when the target device information comprises the identifier information related to the target terminal, using a terminal indicated by the identifier information as the target terminal; and when the target device information does not comprise the identifier information related to the target terminal, searching for a target terminal identifier corresponding to the target device information according to a pre-stored corresponding relationship between the device information and the terminal identifier, and using a terminal corresponding to the target terminal identifier as the target terminal.

7. The method according to claim 6, wherein the target device information comprises at least one of:
a device identifier of the NB-IOT device;
identifier information related to the target terminal;
information of geographical position where the NB-IOT device is currently located;
working frequency band information of the NB-IOT device; or
a device type of the NB-IOT device.

8. A device management method, comprising:
receiving paging information that is sent by a base station and carries target device information of a Narrow Band Internet of Things (NB-IOT) device reported by the NB-IOT device;
adding the NB-IOT device to a device management list based on the paging information;
determining, in the device management list, a NB-IOT device needing a management control currently, the device management list being a device list of all devices managed by the terminal;
generating a management control instruction for managing the NB-IOT device, the management control instruction carrying a device identifier of the NB-IOT device;
sending the management control instruction to the base station, so that the base station forwards the management control instruction to the NB-IOT device according to the device identifier, and the NB-IOT device performs an operation corresponding to the management control instruction; and
determining, by the base station, the terminal according to the target device information based on:
when the target device information comprises the identifier information related to the terminal, taking a terminal indicated by the identifier information as the terminal; and
when the target device information does not comprise the identifier information related to the terminal, searching for a terminal identifier corresponding to the target device information according to a pre-stored corresponding relationship between the device information and the terminal identifier, and taking a terminal corresponding to the terminal identifier as the terminal.

9. The method according to claim 8, wherein the generating the management control instruction for controlling the NB-IOT device comprises:
outputting a preset control instruction option corresponding to the NB-IOT device; and
according to a target control instruction option selected by a user from the preset control instruction option, generating a management control instruction comprising a control content of the target control instruction option.

10. The method according to claim 8, wherein the target device information comprises at least one of:
a device identifier of the NB-IOT device;
identifier information related to the target terminal, information of geographical position where the NB-IOT device is currently located;
working frequency band information of the NB-IOT device; or
a device type of the NB-IOT device.

11. A device management system, the system comprising:
a processor; and
a memory for storing instructions executable by the processor;
wherein the processor is configured to:
receive paging information that is sent by a base station and carries target device information of a NB-IOT device reported by the NB-IOT device;
add the NB-IOT device to a device management list based on the paging information;
determine, in the device management list, an NB-IOT device needing a management control currently, the device management list being a device list of all devices managed by the terminal;
generate a management control instruction for managing the NB-IOT device, the management control instruction carrying a device identifier of the NB-IOT device; and
send the management control instruction to the base station, so that the base station forwards the management control instruction to the NB-IOT device according to the device identifier, and the NB-IOT device performs an operation corresponding to the management control instruction;
wherein the base station is configured to determine the terminal according to the target device information based on:
when the target device information comprises the identifier information related to the terminal, taking a terminal indicated by the identifier information as the terminal; and
when the target device information does not comprise the identifier information related to the terminal, searching for a terminal identifier corresponding to the target device information according to a pre-stored corresponding relationship between the device information and the terminal identifier, and taking a terminal corresponding to the terminal identifier as the terminal.

12. The system according to claim 11, wherein the processor is further configured to:
output a preset control instruction option corresponding to the NB-IOT device; and
according to a target control instruction option selected by a user from the preset control instruction option, generate a management control instruction comprising a control content of the target control instruction option.

13. The system according to claim 11, wherein the target device information comprises at least one of:
a device identifier of the NB-IOT device;
identifier information related to the target terminal, information of geographical position where the NB-IOT device is currently located;
working frequency band information of the NB-IOT device; or
a device type of the NB-IOT device.

* * * * *